(No Model.)
W. G. KENDALL.
CUSHION TIRE FOR VEHICLE WHEELS.
No. 597,612. Patented Jan. 18, 1898.
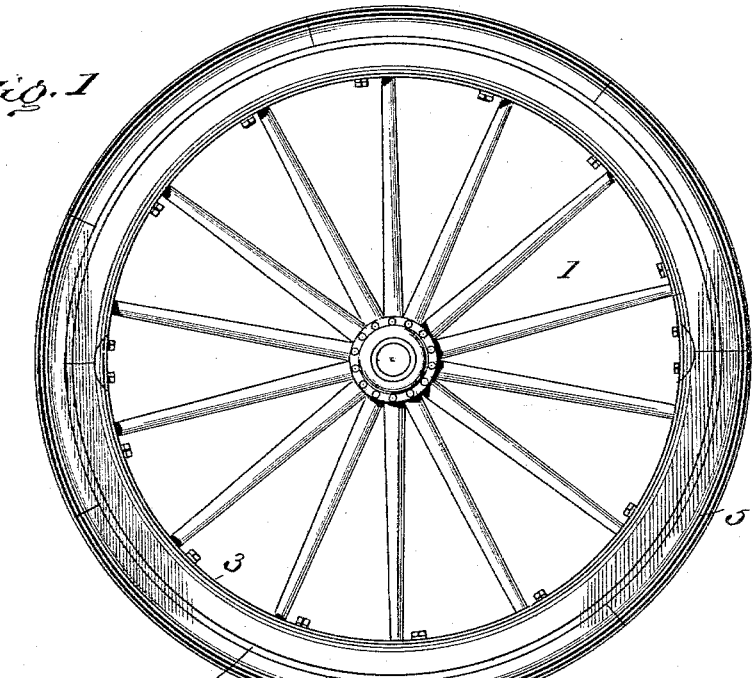
Fig. 1
Fig. 2.
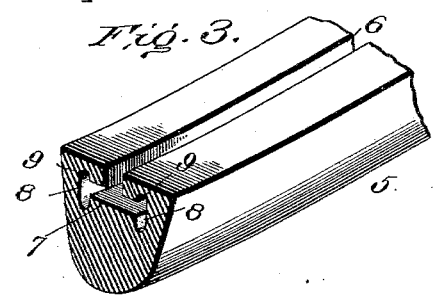
Fig. 3.
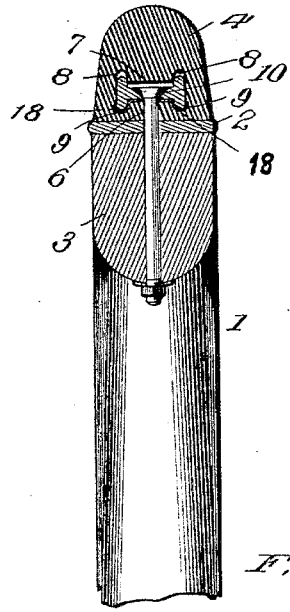
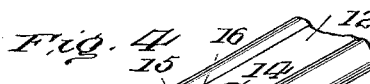
Fig. 4
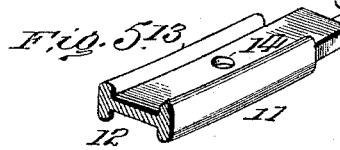
Fig. 5.
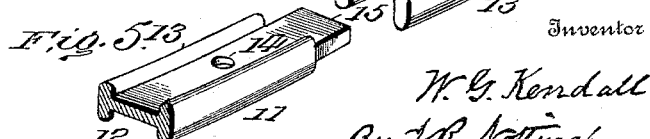
Witnesses
Edward C. Wells
Inventor
W. G. Kendall
By J. R. Nottingham
Attorney

UNITED STATES PATENT OFFICE.

WEBBER G. KENDALL, OF PROVIDENCE, RHODE ISLAND.

CUSHION-TIRE FOR VEHICLE-WHEELS.

SPECIFICATION forming part of Letters Patent No. 597,612, dated January 18, 1898.

Application filed November 5, 1897. Serial No. 657,542. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires for Vehicle-Wheels; and I do hereby declare the following to be a full, clear, and exact description of the invention, such as will enable others skilled in the art to which it appertains to make and use the same.

My invention relates to that class of rubber tires commonly called "cushion-tires," and it is especially adapted to the ordinary metal-tired vehicle-wheel.

Heretofore in this class of tires it has been usual to provide a specially-constructed rim in which to seat and confine the tire, which adds greatly to the cost of construction and is otherwise objectionable. Also great difficulty has been experienced in providing efficient means by which the rubber tire may be firmly and rigidly held upon the rim against lateral strain, which is especially injurious to the weaker parts of the average rubber cushion-tire. The present invention is particularly designed to overcome these difficulties; and to that end it consists of a tire preferably molded in sections, having an interior longitudinal chamber extending at two or more points of its width toward the tread of the tire and toward its inner periphery and adapted to receive a clamping-band provided with resistance means, said tire being so constructed as to permit the employment of securing-bolts for attaching the tire to the wheel.

In the accompanying drawings, Figure 1 is a side view of a vehicle-wheel having the usual metal tire, showing my improved cushion-tire applied thereto; Fig. 2, a cross-section of a portion of the same; Fig. 3, a perspective view of a portion of one of the rubber-tire sections; Fig. 4, a similar view of the end portions of two united sections of the confining-band, and Fig. 5 also a perspective view of said end portions separated to show the manner in which the sections are connected.

Referring to the several views, the numeral 1 indicates a wheel, which is provided with a metal tire 2, of the usual form, set on the rim or felly 3.

The rubber tire 4 is preferably composed of a series of sections 5, each section being preferably molded with a channel 6, running the full length of the section. This channel communicates with an interior longitudinal chamber 7, having upwardly and downwardly extending chambers 8, which form hook-shaped seats 9 and $9^a$, respectively, for a suitable clamping-band.

The numeral 10 indicates the clamping-band, which is composed of a series of metallic sections 11, each section consisting of a plate 12, formed with a double flange 13 at each side edge and conforming in shape, in cross-section, and curvature to the cavity formed by the chamber 7 and the vertically-extending chambers 8. Each section-plate is provided with bolt-holes 14, suitably countersunk to allow the heads of the bolts to be flush with the surface of the flat portion of the plate, and the sections are united together by means of a tongue 15 and a groove 16, as shown in Figs. 4 and 5.

In applying my improved tire to the ordinary wheel holes corresponding to the holes in the sectional clamping-band are bored through the rim or felly and the metal tire. A plate-section is placed in position and the confining-bolts 17 dropped through the holes in the plate, metal tire, and felly. A section of the rubber tire is then slipped on the plate-section and partially secured by tightening the nuts on the bolts. Another plate-section is placed in position and a second section of rubber tire slipped thereon, the operation being continued until all of the sections of both clamping-band and rubber tire have been properly placed in position and partially secured by tightening the nuts. In placing the last section of the clamping-band and its section of rubber tire it will be found necessary to crowd back the respective ends of the rubber tire, so that said sections may be placed in position. After all of the sections have been positioned the nuts on the clamping-band are fully tightened to secure the sectional tire rigidly and firmly onto the wheel. By referring to Fig. 2 it will be seen that the lower flanges of the band rest in the concave or downwardly-extended portions of the chamber 7, with the horizontal flat portion thereof resting upon the straight portion of said chamber, and that the upper flanges of the band are seated up in the concave or downwardly-extended portions of the chamber 7, with the horizontal portion thereof seated against the straight portion of said chamber, so that a resistance means is provided in each extension of the chamber 7 to protect the weaker parts of the tire against lateral strain.

The peculiar shape in cross-section of the interior cavity forms an important feature of my invention, as it is adapted to receive the flanges or ribs 13 of the clamping-band, which flanges serve, when seated in the upward extensions of the chamber 7, as a means of resistance against any lateral strain that may be brought to bear upon either side of the tire and thereby prevent injury to the same. The flanges seated in the lower extensions of the chamber 7 serve to resist or prevent any tendency of the tire to spread at either side of the channel or slot 6, so that I am able to apply my improved cushion-tire to a flat rim or a metal-tired wheel without the aid of side flanges or specially-constructed rims.

Another important feature of the invention is the construction of the tire in sections, which permits of the removal of a section when injured or damaged and its replacement by a new one without the necessity of removing or disturbing the other sections.

It will be noted that when the clamping-band is forced firmly to its seats in the rubber tire by the bolts and nuts a sufficient space in the tire above the band will be formed to serve as a cushion.

If desired, a lining 18, of leather, canvas, or similar material, may be placed in the hook-shaped seats to give additional stiffness to the tire along that portion; but I prefer not to use it, as it is sufficiently stiff without it.

To apply my tire to wheels now in use, all that is necessary is to remove the bolts securing the metal tire to the felly and replace them with longer bolts and then proceed to place the rubber-tire and clamping-band sections in position, as heretofore described.

Having thus fully described my invention, what I claim as new, and desire to secure by Letters Patent, is—

1. As an article of manufacture, a rubber tire having an interior longitudinal chamber, said chamber being extended, at two or more points of its width, in the direction of its tread and toward its inner periphery, and adapted to receive resistance means, said tire being constructed to permit access to its chamber.

2. A rubber tire, having an interior longitudinal chamber, said chamber being extended, at two or more points of its width, in the direction of its tread, in combination with a clamping-band and resistance means, whereby the tire may be secured onto a wheel and injury to the same, by lateral strain, prevented.

3. As a new article of manufacture, a rubber tire, having an interior longitudinal cavity or chamber, said cavity or chamber being extended, at two or more points of its width, toward its tread and toward its inner periphery, and provided with a channel or slot opening from the inner periphery into the longitudinal chamber.

4. A rubber tire, having an interior longitudinal cavity, said cavity being extended, at two or more points of its width, in diametrically opposite directions, and having a channel or slot opening from the inner periphery into said cavity, in combination with a clamping-band provided with an oppositely-extending resistance means and bolts, whereby the band, and thereby the tire, may be secured onto a wheel.

5. The combination with a rubber tire having an interior longitudinal cavity H shape in cross-section, and a channel or slot communicating with said cavity, of a clamping-band having upwardly and downwardly extending flanges or ribs seated in the upper and lower vertical portions of the cavity, and means for securing the band, and thereby the tire, onto a wheel.

6. The combination with a metal-tired wheel, of a rubber tire formed with two interior longitudinal hook shape seats, separated by a longitudinal channel in the inner periphery of said rubber tire, and a clamping-band having side flanges adapted to fit the depressed portion of the seats, whereby the rubber tire may be secured onto the wheel.

7. The combination with a metal-tired wheel, of a rubber tire composed of sections, each section formed with interior longitudinal hook shape seats, separated by a longitudinal channel in the inner periphery of said rubber tire, a sectional clamping-band having side flanges adapted to fit the depressed portion of the seats, and bolts for securing the band, and thereby the tire, to the wheel.

In testimony whereof I affix my signature in the presence of two witnesses.

WEBBER G. KENDALL.

Witnesses:
J. R. NOTTINGHAM,
HERBERT M. LOCKE.